US007883417B2

(12) United States Patent
Bruzzese et al.

(10) Patent No.: US 7,883,417 B2
(45) Date of Patent: Feb. 8, 2011

(54) GAMING MACHINE COMMUNICATING SYSTEM

(75) Inventors: Vincent Carmelo Bruzzese, Oatlands (AU); Scott Paul Shelley, Heathcote (AU); Richard E. Rowe, Las Vegas, NV (US)

(73) Assignee: IGT, Reno, NV (US)

( * ) Notice: Subject to any disclaimer, the term of this patent is extended or adjusted under 35 U.S.C. 154(b) by 879 days.

(21) Appl. No.: 10/817,156

(22) Filed: Apr. 2, 2004

(65) Prior Publication Data

US 2004/0209690 A1 Oct. 21, 2004

Related U.S. Application Data

(60) Continuation-in-part of application No. 10/044,218, filed on Nov. 19, 2001, now Pat. No. 6,971,956, which is a division of application No. 09/544,884, filed on Apr. 7, 2000, now Pat. No. 6,682,421, application No. 10/817,156, which is a continuation-in-part of application No. 09/718,974, filed on Nov. 22, 2000, now Pat. No. 6,682,031.

(30) Foreign Application Priority Data

Apr. 3, 2003 (AU) .............................. 2003901552

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................. 463/39; 463/25; 463/29; 463/30; 463/37; 463/40; 463/43; 463/47

(58) Field of Classification Search ................... 463/25, 463/29, 30, 37, 39, 40, 43, 47
See application file for complete search history.

(56) References Cited

U.S. PATENT DOCUMENTS 4,575,621 A 3/1986 Dreifus (Continued)

FOREIGN PATENT DOCUMENTS

AU 199954012 4/2000

(Continued)

OTHER PUBLICATIONS

Foreign Search Report and Written Opinion dated Jul. 25, 2005 from corresponding PCT Application No. PCT/US2005/011217 (11 pages).

(Continued)

*Primary Examiner*—John M Hotaling, II
*Assistant Examiner*—Adetokunbo Torimiro
(74) *Attorney, Agent, or Firm*—Weaver Austin Villeneuve & Sampson LLP

(57) ABSTRACT

A disclosed gaming system allows game configuration of gaming machines in the gaming system via wireless transmissions from a hand-held device. For instance, via the hand-held device, a user can configure a plurality of gaming machines in range of the device with different games or hardware settings. Further, via the hand-held device, a user can gather information from a number of gaming machines in range of the device.

33 Claims, 1 Drawing Sheet

U.S. PATENT DOCUMENTS 4,764,666 A 8/1988 Bergeron
4,768,151 A 8/1988 Birenbaum et al.
4,856,787 A * 8/1989 Itkis .......................... 273/237
5,061,845 A 10/1991 Pinnavaia
5,129,652 A 7/1992 Wilkinson
5,179,517 A 1/1993 Sarbin et al.
5,218,356 A 6/1993 Knapp
5,244,207 A 9/1993 Laatikainen
5,265,874 A 11/1993 Dickinson et al.
5,326,104 A 7/1994 Pease et al.
5,382,784 A 1/1995 Eberhardt
5,505,461 A 4/1996 Bell et al.
5,528,248 A * 6/1996 Steiner et al. .......... 342/357.06
5,557,086 A 9/1996 Schulze et al.
5,586,936 A 12/1996 Bennett et al.
5,613,911 A 3/1997 Takemoto et al.
5,618,045 A 4/1997 Kagan et al.
5,628,685 A 5/1997 Takemoto et al.
5,643,086 A 7/1997 Alcorn et al.
5,678,886 A 10/1997 Infanti
5,738,583 A 4/1998 Comas et al.
5,741,183 A 4/1998 Acres et al.
5,752,882 A 5/1998 Acres et al.
5,759,102 A * 6/1998 Pease et al. .................. 463/42
5,761,647 A 6/1998 Boushy et al.
5,768,382 A 6/1998 Schneier et al.
5,770,533 A 6/1998 Franchi
5,779,545 A 7/1998 Berg et al.
5,779,546 A 7/1998 Meissner et al.
5,779,549 A 7/1998 Walker et al.
5,795,228 A 8/1998 Trumbull et al.
5,797,085 A 8/1998 Beuk et al.
5,816,917 A 10/1998 Kelmer et al.
5,871,398 A 2/1999 Schneier et al.
5,915,023 A 6/1999 Bernstein
5,967,896 A 10/1999 Jorasch et al.
5,971,855 A * 10/1999 Ng ............................. 463/42
5,999,808 A 12/1999 LaDue
6,001,016 A 12/1999 Walker et al.
6,003,013 A 12/1999 Boushy et al.
6,012,832 A 1/2000 Saunders et al.
6,012,983 A 1/2000 Walker et al.
6,019,283 A 2/2000 Lucero
6,048,269 A 4/2000 Burns et al.
6,068,552 A 5/2000 Walker et al.
6,093,100 A 7/2000 Singer et al.
6,104,815 A 8/2000 Alcorn et al.
6,106,396 A 8/2000 Alcorn et al.
6,110,041 A 8/2000 Walker et al.
6,117,013 A 9/2000 Eiba
6,142,876 A 11/2000 Cumbers
6,149,522 A 11/2000 Alcorn et al.
6,165,071 A 12/2000 Weiss
6,210,279 B1 4/2001 Dickinson
6,253,119 B1 6/2001 Dabrowski
6,254,006 B1 7/2001 Mish
6,270,410 B1 8/2001 DeMar et al.
6,280,326 B1 8/2001 Saunders
6,284,406 B1 9/2001 Xing et al.
6,285,868 B1 9/2001 LaDue
6,287,200 B1 * 9/2001 Sharma ...................... 463/40
6,312,333 B1 11/2001 Acres
6,331,144 B1 12/2001 Walker et al.
6,340,331 B1 1/2002 Saunders et al.
6,343,988 B1 2/2002 Walker et al.
6,347,996 B1 2/2002 Gilmore et al.
6,379,248 B1 * 4/2002 Jorasch et al. ................ 463/25
6,383,077 B1 * 5/2002 Kweitko et al. ............... 463/40
6,431,983 B2 8/2002 Acres
6,439,996 B2 8/2002 LeMay et al.
6,488,585 B1 * 12/2002 Wells et al. .................. 463/43
6,508,709 B1 1/2003 Karmarkar
6,511,377 B1 1/2003 Weiss
6,514,140 B1 2/2003 Storch
6,533,662 B2 3/2003 Soltys et al.
6,554,707 B1 4/2003 Sinclair et al.
6,564,995 B1 5/2003 Montgomery
6,564,997 B1 5/2003 Juds
6,579,185 B1 6/2003 Honda et al.
6,582,311 B1 6/2003 Sugimura
6,612,928 B1 9/2003 Bradford et al.
6,676,522 B2 * 1/2004 Rowe et al. .................. 463/42
6,679,775 B1 1/2004 Lucian et al.
6,681,984 B2 1/2004 Brunner
6,682,421 B1 1/2004 Rowe et al.
6,687,700 B1 * 2/2004 Cornelius et al. ............ 707/10
6,702,672 B1 3/2004 Angell et al.
6,712,698 B2 3/2004 Paulsen et al.
6,716,103 B1 * 4/2004 Eck et al. ...................... 463/45
6,722,985 B2 4/2004 Criss-Puszkiewicz et al.
6,729,957 B2 5/2004 Burns et al.
6,732,195 B1 * 5/2004 Baldwin ........................ 710/6
6,758,393 B1 7/2004 Luciano et al.
6,761,637 B2 * 7/2004 Weston et al. ................ 463/42
6,800,029 B2 10/2004 Rowe et al.
6,805,634 B1 * 10/2004 Wells et al. .................. 463/42
6,846,238 B2 1/2005 Wells
6,852,031 B1 2/2005 Rowe
6,935,958 B2 * 8/2005 Nelson ........................ 463/42
6,971,956 B2 12/2005 Rowe et al.
6,984,175 B2 1/2006 Nguyen et al.
7,260,834 B1 * 8/2007 Carlson ........................ 726/4
2001/0006195 A1 7/2001 Sukeda et al.
2001/0044337 A1 11/2001 Rowe et al.
2002/0047044 A1 4/2002 Orus et al.
2002/0111815 A1 8/2002 Smith
2002/0142846 A1 10/2002 Paulsen
2002/0152120 A1 10/2002 Howington
2003/0031321 A1 2/2003 Mages
2003/0045353 A1 3/2003 Paulsen et al.
2003/0045354 A1 3/2003 Giobbi
2003/0083126 A1 5/2003 Paulsen et al.
2003/0087652 A1 * 5/2003 Simon et al. ................ 455/466
2003/0148812 A1 8/2003 Paulsen et al.
2003/0228907 A1 12/2003 Gatto et al.
2004/0002386 A1 1/2004 Wolfe et al.
2004/0048667 A1 3/2004 Rowe
2004/0204244 A1 * 10/2004 Rathsack et al. .............. 463/42
2005/0009600 A1 1/2005 Rowe et al.
2005/0054438 A1 3/2005 Rothschild et al.
2005/0124407 A1 6/2005 Rowe
2005/0124411 A1 6/2005 Schneider et al.
2006/0068904 A1 3/2006 Nguyen et al.
2007/0004510 A1 1/2007 Underdahl et al.
2007/0060311 A1 3/2007 Rowe et al.
2007/0060394 A1 3/2007 Gowin et al.
2007/0087834 A1 4/2007 Moser et al.
2007/0099696 A1 5/2007 Nguyen et al.
2007/0117623 A1 5/2007 Nelson et al.
2008/0188308 A1 8/2008 Shepherd et al.

FOREIGN PATENT DOCUMENTS

AU 2001249901 10/2001
AU 2001255746 11/2001
CA 2312121 12/2000
DE 42 05 098 8/1993
DE 195 02 613 8/1996
EP 0 015 081 9/1980
EP 0 360 613 3/1990
EP 1 004 970 5/2000
EP 1 139 310 A2 4/2001
EP 1 465 127 A2 10/2004
GB 2 161 629 A 1/1986

| | | | |
|---|---|---|---|
| RU | 2 060 756 | | 5/1996 |
| RU | 2 072 560 | | 1/1997 |
| RU | 2 132 569 | C1 | 6/1999 |
| RU | 2 145 116 | | 1/2000 |
| WO | WO 95/10824 | | 4/1995 |
| WO | WO 95/24689 | | 9/1995 |
| WO | WO 96/00950 | | 1/1996 |
| WO | WO 96/12262 | | 4/1996 |
| WO | WO 97/19537 | | 5/1997 |
| WO | WO 97/44750 | | 11/1997 |
| WO | WO 98/30297 | | 7/1998 |
| WO | WO 99/10061 | | 3/1999 |
| WO | WO 99/16030 | | 4/1999 |
| WO | WO 99/22350 | | 5/1999 |
| WO | WO 99/23594 | | 5/1999 |
| WO | WO 99/51313 | | 10/1999 |
| WO | WO 00/79467 | | 12/2000 |
| WO | WO 01/25992 | | 4/2001 |
| WO | WO 01/54091 | | 7/2001 |
| WO | WO 01/74461 | | 10/2001 |
| WO | WO 01/76710 | | 10/2001 |
| WO | WO 01/91075 | | 11/2001 |
| WO | WO 01/91866 | | 12/2001 |
| WO | WO 02/21370 | | 3/2002 |
| WO | WO 02/043019 | | 5/2002 |
| WO | WO 02/058020 | | 7/2002 |
| WO | WO 02/103550 | A1 | 12/2002 |
| WO | WO 03/015299 | | 2/2003 |
| WO | WO 03/084625 | | 10/2003 |
| WO | WO 2004/024268 | | 3/2004 |
| WO | WO 2004/064354 | | 7/2004 |
| WO | WO 2004/090818 | | 10/2004 |
| WO | WO 2005/098766 | | 10/2005 |
| WO | WO 2006/010011 | | 1/2006 |
| WO | WO 2009/126736 | | 10/2009 |

OTHER PUBLICATIONS

European Search Report dated Jun. 30, 2005 from corresponding EP Application No. 04252032.0 (3 pages).

International Search Report dated Nov. 7, 2005 from corresponding PCT Application No. PCT/US2005/024298 (4 pages).

International Search Report and Written Opinion dated Mar. 13, 2006 from a related PCT Application No. PCT/US2005/024298 (15 pages).

UK Examination Report dated Apr. 28, 2006 from related Application No. 0422040.6 (2 pages).

Examination Report dated Mar. 28, 2007, from corresponding British Patent Application No. GB0620783.1.

U.S. Office Action dated Jun. 7, 2004 from related U.S. Appl. No. 10/085,779.

Notice of Allowance and Fee(s) Due dated Apr. 5, 2005 from related U.S. Appl. No. 10/085,779.

Notice of Allowance and Fee(s) Due dated Sep. 27, 2005 from related U.S. Appl. No. 10/085,779.

U.S. Office Action dated Jun. 1, 2004 from related U.S. Appl. No. 10/044,218.

U.S. Final Office Action dated Jan. 25, 2005 from related U.S. Appl. No. 10/044,218.

Notice of Allowance and Fee(s) Due dated Jun. 15, 2005 from related U.S. Appl. No. 10/044,218.

U.S. Final Office Action dated Dec. 16, 2003 from related U.S. Appl. No. 10/115,164.

U.S. Office Action dated Jul. 2, 2003 from related U.S. Appl. No. 10/115,164.

LeMay et al., "Gaming Machine Virtual Player Tracking and Related Services", Filed Aug. 18, 2000, U.S. Appl. No. 09/642,192.

Examination Report dated Nov. 13, 2007, from corresponding British Patent Application No. GB0620783.1, 2 pages.

U.S. Office Action dated Nov. 29, 2001 issued in U.S Appl. No. 09/544,884.

U.S. Office Action Final dated Jun. 5, 2002 issued in U.S. Appl. No. 09/544,884.

U.S. Office Action dated Nov. 12, 2002 issued in U.S. Appl. No. 09/544,884.

U.S. Office Action (Examiner Interview Summary) dated Feb. 4, 2003 issued in U.S. Appl. No. 09/544,884.

U.S. Office Action Final dated May 7, 2003 issued in U.S. Appl. No. 09/544,884.

U.S. Office Action (Examiner Interview Summary) dated Aug. 8, 2003 issued in U.S. Appl. No. 09/544,884.

U.S. Notice of Allowance and Allowability dated Dec. 10, 2003 issued in U.S. Appl. No. 09/544,884.

U.S. Office Action (Examiner Interview Summary) dated Apr. 8, 2005 issued in U.S. Appl. No. 10/044,218.

U.S. Supplemental Notice of Allowance dated Sep. 30, 2005 issued in U.S. Appl. No. 10/044,218.

U.S. Office Action (Advisory Action) dated Mar. 3, 2004 issued in U.S. Appl. No. 10/115,164.

U.S. Notice of Allowance dated Apr. 9, 2004 issued in U.S. Appl. No. 10/115,164.

U.S. Office Action dated Jun. 24, 2008 issued in U.S. Appl. No. 10/886,944.

U.S. Office Action dated Mar. 10, 2009 issued in U.S. Appl. No. 10/886,944.

Bronstein et al., (Aug. 2005) "Three-Dimensional Face Recognition", *International Journal of Computer Vision*, 64:1, 44 pages.

Yolanda Smulike Roche and Roger C. Roche, "The Tax Man Cometh", CasinoGaming.com Parts I and II, [http://www.casinogaming.com/features/taxlaws.html, downloaded on Dec. 8, 2008], 8 pages.

Yuan et al., (2001) "Virtual Private Networks-Technologies and Solutions", Addison Wesley, ISBN#0-201-70209-6, 8 pages.

U.S. Office Action Final dated Jul. 31, 2009 issued in U.S. Appl. No. 10/886,944.

U.S. Office Action dated Apr. 2, 2010 issued in U.S. Appl. No. 10/886,944.

U.S. Office Action dated Jul. 30, 2003 issued in U.S. Appl. No. 09/718,974.

U.S. Office Action Final dated Dec. 30, 2003 issued in U.S. Appl. No. 09/718,974.

U.S. Office Action (Examiner Interview Summary) dated Mar. 18, 2004 issued in U.S. Appl. No. 09/718,974.

U.S. Notice of Allowance dated Sep. 30, 2004 issued in U.S. Appl. No. 09/718,974.

U.S. Office Action dated Jun. 23, 2008 issued in U.S. Appl. No. 11/040,697.

U.S. Office Action Final dated Feb. 2, 2009 issued in U.S. Appl. No. 11/040,697.

U.S. Office Action dated Jul. 8, 2009 issued in U.S. Appl. No. 11/040,697.

U.S. Office Action Final dated Feb. 19, 2010 issued in U.S. Appl. No. 11/040,697.

U.S. Office Action dated Aug. 22, 2002 issued in U.S. Appl. No. 09/882,559.

U.S. Office Action Final dated Jan. 27, 2003 issued in U.S. Appl. No. 09/882,559.

U.S. Notice of Allowance dated Jul. 16, 2003 issued in U.S. Appl. No. 09/882,559.

PCT International Search Report dated Mar. 18, 2002 issued in PCT/US2001/11134 (WO 2001/76710).

PCT Written Opinion dated May 3, 2002 issued in PCT/US2001/11134 (WO 2001/76710).

PCT International Preliminary Examination Report dated Jul. 2, 2002 issued in PCT/US2001/11134 (WO 2001/76710).

Australian Office Action dated May 25, 2005 issued in AU2001249901.

Australian Notice of Acceptance dated Feb. 26, 2007 issued in AU2001249901.

Canadian Examination Report dated Mar. 20, 2009 issued in 2,405,166.

European Examination Report dated Dec. 15, 2004 issued in EP01923183.6.

European Office Action (Rule 51(4) EPC) dated Oct. 24, 2005 issued in EP01923183.6.

European Search Report dated Jun. 12, 2006 issued in EP 06003771.0.
PCT International Search Report dated Jul. 23, 2003 issued in PCT/US2003/09027 (WO2003/084625).
PCT International Preliminary Examination Report dated Jan. 27, 2004 issued in PCT/U52003/09027 (WO 2003/084625).
Australian Examiner's First Report dated Jul. 3, 2008 issued in AU2003225966.
UK Examination Report dated Apr. 7, 2005 issued in GB0422040.6.
PCT International Preliminary Report on Patentability and Written Opinion dated Apr. 19, 2006 issued in PCT/US2005/024298 (WO2006/010011).
AU First Examiner's Report dated Feb. 26, 2010 issued in AU 2005265273.
PCT International Search Report and Written Opinion dated Jul. 3, 2009 issued in PCT/US2009/039953.
PCT International Search Report dated Apr. 9, 2003 issued in PCT/US2001/023724 (WO 2002/043019).
PCT International Written Opinion dated May 6, 2003 issued in PCT/US2001/023724 (WO 2002/043019).
PCT International Preliminary Examination Report dated Jun. 25, 2003 issued in PCT/US2001/023724 (WO 2002/043019).
AU Examiner's First Report dated Feb. 15, 2006 issued in 2001 280 853.
CA Office Action dated Aug. 8, 2006 issued in CA Application No. 2,429,529.
CA Office Action dated Nov. 14, 2007 issued in CA Application No. 2,429,529.
PCT International Preliminary Examination Report dated Aug. 22, 2003 issued in PCT/US02/18875.
PCT International Search Report dated Sep. 12, 2002 issued in PCT/US02/18875.
PCT Written Opinion dated Feb. 24, 2003 issued in PCT/US02/18875.
AU Examiner's First Report dated Mar. 23, 2007 issued in AU 2002322096.
AU Examiner's Second Report dated Oct. 23, 2007 issued in AU 2002322096.
AU Notice of Opposition dated Apr. 6, 2009 issued in AU 2002322096.
AU Statement of Grounds and Particulars dated Jul. 3, 2009 issued in AU 2002322096.
AU Notice Opposition has been Withdrawn dated Aug. 19, 2009 issued in AU 2002322096.
European Supplementary Search Report dated Dec. 4, 2008 issued in EP 02 756 187.7-2221.
European Examination Report dated Mar. 2, 2009 issued in EP 02 756 187.7-2221.
RU Advisory Office Action dated May 31, 2006 issued in RU 2003136278/09 (039240).
RU Resolution on Granting dated Oct. 4, 2006 issued in RU 2003136278/09 (039240).
PCT International Search Report dated Jul. 25, 2005 issued in PCT/US2005/011217 (WO2005/098766).
PCT International Preliminary Report on Patentability and Written Opinion dated Oct. 4, 2006 issued in PCT/US2005/011217 (WO2005/098766).
AU Examiner's first report datd Dec. 18, 2009 issued in AU Application No. 2005232204.
Artobolevsky, I.I. Polytechnic dictionary, Moscow, Soviet Encyclopedia, 1976, p. 426.
Norenkov et al. (1888) "Telecommunication technologies and networks", Moscow, Publishing House of the Moscow State Technical University named after Bauman, 7:30.
Schneier B. (1996) "Applied Cryptography, Second Edition," *Applied Cryptography, Protocols, Algorithms, and Source Code in C*, pp. 31-38, 50-51 (8 pgs), XP002248999, ISBN: 0-471-11709-9.
Wang et al., (Jan. 1, 2000) "Casino Technology: Player Tracking and Slot Accounting Systems", *Gaming Research and Review Journal*, UNLV International Gaming Institute, Las Vegas, NV, US, pp. 43-56.
"The Tax Man Cometh," CasinoGaming.com, Parts I and II (undated).

* cited by examiner

GAMING MACHINE COMMUNICATING SYSTEM

CROSS-REFERENCE TO RELATED APPLICATIONS

This application is a continuation-in-part and claims priority under 35 U.S.C. §120 from co-pending U.S. patent application Ser. No. 10/044,218, filed Nov. 19, 2001, naming Richard E. Rowe as inventor, and titled "WIRELESS GAMING ENVIRONMENT" which claimed priority under 35 U.S.C. §120 from co-pending U.S. application Ser. No. 09/544,884 filed Apr. 7, 2000 naming Richard E. Rowe as inventor, and titled "WIRELESS GAMING ENVIRONMENT," now issued as U.S. Pat. No. 6,682,421 each of which is incorporated herein in their entirety and for all purposes;

and the application is a continuation-in-part and claims priority under 35 U.S.C. §120 from co-pending U.S. patent application Ser. No. 09/718,974, filed Nov. 22, 2000, naming Richard E. Rowe as inventor, and titled, "EZ PAY SMART CARD AND TICKET SYSTEM," which is incorporated here in its entirety and for all purposes;

and the application claims priority under 35 U.S.C. §119(a) from Australian Application No. 2003 901 552, filed 3 Apr. 2003 in the Australian Patent office and titled "GAMING MACHINE COMMUNICATING SYSTEM," which is incorporated herein in its entirety and for all purposes.

TECHNICAL FIELD

The present invention relates to gaming establishments having a plurality of gaming machines and, in particular, to a communications and data transfer system for such gaming establishments.

BACKGROUND

There are many functions that might be termed "low security" which are carried out by employees of the gaming establishment which require interaction between the employee and the machine. An example of such an interaction is switching all machines at a venue, or all machines in a given locality at a venue, to operate a specific game. For example, if a venue is expecting a lunch time visit by a group of elderly bowlers, croquet players, or the like, the venue may wish to have the gaming machines offer games which appeal to elderly players. However, at the same venue on the evening of the same day, the venue may be hosting an engagement reception at which the guests will predominantly be young friends of the engaged couple. Thus, under these circumstances, it is desirable to have the gaming machines offer games that appeal to young adult players. Clearly, a need therefore exists for such machines to be quickly changed from the one game to another. There are other functions of a similar nature (to be described hereafter), which might also be termed "low security" functions.

This is to be contrasted with other functions requiring interaction between an operator and the gaming machines. Typically, these interactions require access to the interior of a gaming machine and are carried out under strict security protocols. For instance, when access to the gaming machine is authorized, it is often requires two or more people to be present at the gaming machine, a technician and a regulator from the gaming jurisdiction or a security person from the casino. These might for convenience be termed "high security" functions.

One example of a "high security," activity is the changing of the data and instructions constituting the operating software of a game or games. Not only is such data voluminous (typically approximately 30-100 Mb) but also the link must be secure against criminal elements that may seek to tamper with such software. Another example of what might be termed "high security" activity is the monitoring of game results and the provision of data to game licensing authorities upon which data the taxation liability of the venue can be, or is, calculated.

In the gaming industry there is a desire to provide "low security" and "high security," services for gaming machines at their point of operation (e.g., in a casino) while limiting time costs and labor costs associated with these services (A time cost may be revenues that are lost when a gaming machine is not operable during servicing.) Therefore, in view of the above, it is desirable to provide a communication and data transfer system for gaming establishments which enables the status of gaming machines to be monitored and/or various operational control parameters of gaming machines to be changed in a more timely and less labor intensive manner.

SUMMARY

In accordance with a first aspect of the present invention there is disclosed a communications and data transfer system for gaming establishments having a plurality of gaming machines arranged in proximity to each other, said system comprising a hand held portable transposer adapted to transmit and receive modulated electromagnetic radiation over a limited range which approximates to only the linear distance occupied by said gaming machines, said transposer further having a display means and input means, and each of said gaming machines includes a communication module connected with the electronic controller of each said gaming machine whereby identification and control signals for a specific one or ones of said plurality of adjacent gaming machines can be input to, and sent from, said transposer to the master gaming controller of the selected gaming machine(s) and in reply thereto, status data of said selected gaming machine(s) can be sent to, or overwritten by, said transposer.

The communication with the gaming machine may be provided through a wireless interface on the gaming machine. In one embodiment, the wireless interface may be located on a player tracking unit connected to the gaming machine. In another embodiment, the wireless interface may be provided through an antenna coupled to the gaming machine.

In accordance with a second aspect of the present invention there is disclosed a method of outputting or changing status data of a selected one or ones of a plurality of electronic gaming machines each having a master gaming controller with an electromagnetic communication module connected thereto, said plurality of gaming machines being arranged in proximity to each other in a gaming establishment. The method may be generally characterized as comprising (i) bringing within range of said selected gaming machine a hand held portable transposer adapted to transmit and receive modulated electromagnetic radiation over a limited range which approximates to only the linear distance occupied by said gaming machines, (ii) transmitting identification and control signals from said transposer to said selected gaming machine(s) to both select same and enable the electronic controller thereof, and receiving from said selected gaming machine(s) at said transposer, status data of said selected gaming machine, and/or transmitting from said transposer to said selected gaming machine(s) status data which is overwritten into the master gaming controller of said selected gaming machine(s).

These and other features and advantages of the present invention will be described in the following description of the invention and associated figures.

BRIEF DESCRIPTION OF THE DRAWINGS

The included drawings are for illustrative purposes and serve only to provide examples of possible structures and process steps for the disclosed inventive systems and methods for providing player verification in remote gaming terminals and other associated locations. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

Figure 1:
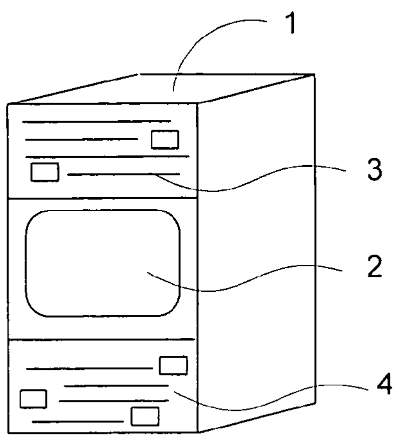
FIG. 1 Prior Art
FIG. 1 is a perspective view of a prior art multigame poker machine.

As seen in FIG. 1 a prior art gaming machine 1 has a video screen 2 located between an upper panel 3 and a lower panel 4. The screen 2 displays moving images (typically of rotating reels each of which carries symbols of various kinds), whilst the panels 3,4 carry artwork of various kinds, which is fixed as to the information displayed. Conventionally, the upper panel 3 displays the name of the game or games offered by the machine and is intended to attract a player to the machine. The lower panel 4 typically sets out the table of winning combinations and information about the rules of the game, which a player needs to know. Also provided but not illustrated are conventional items such as a coin receiving slot, bill receptacle, play and reserve buttons, and the like.

Figure 2:
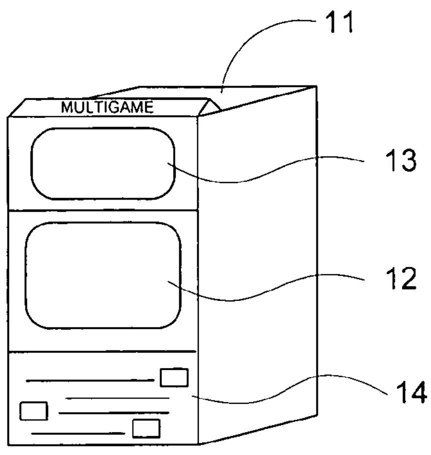
FIG. 2 is a perspective view of one embodiment of a multigame poker machine of the present invention.

This is to be contrasted with the gaming machine 11 of the preferred embodiment illustrated in FIG. 2 which has a substantially conventional (lower) screen 12 and panel 14 but has an upper screen 13 instead of the upper panel 3. As before, the panel 14 sets out the table of winning combinations, etc and the conventional coin receiving slot etc. are not illustrated in FIG. 2. Details of a gaming machine with a secondary display, such as upper screen 13, that may be used with the present invention are described in U.S. Pat. No. 6,135,884, issued Oct. 24, 2000 and titled "GAMING MACHINE HAVING SECONDARY DISPLAY FOR PROVIDING VIDEO CONTENT," which is incorporated herein by reference in its entirety and for all purposes.

Understand that gaming machine 11 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 2, when a user wishes to play the gaming machine 11, he or she inserts cash through a coin acceptor or bill validator. Additionally, the bill validator may accept a printed ticket voucher that may be accepted by the bill validator as indicia of credit. During the game, the player typically views game information and game play using the video display 12.

During the course of a game, a player may be required to make a number of decisions, which affect the outcome of the game. For example, a player may vary his or her wager on a particular game, select a prize for a particular game, or make game decisions, which affect the outcome of a particular game. The player may make these choices using the player-input switches, the video display screen 12 or using some other device which enables a player to input information into the gaming machine.

In a particular embodiment, the machine 11 is a multigame machine. Stored electronically within the machine 11 are several different games and for each game a different display for the upper screen 13 is stored. Changing the game played on the machine 11 enables the corresponding display to be viewed on the upper screen 13. Since the screen 13 has replaced the panel 3, the upper display can be animated, thereby making it both more attractive and more attention getting. In some jurisdictions, such as New Zealand, the number of machines 11, which a particular gaming establishment can operate is strictly limited to machines which are able to offer a plurality of games. Thus multigame machines are of increased economic worth.

In another embodiment, additional games and the displays for a game may be stored on another a remote server and may be made available for download to the gaming machine 11. Details of a game server that may be used with the present invention to download additional games are described in U.S. Pat. No. 6,645,077, issued Nov. 11, 2003, and titled "GAMING TERMINAL DATA REPOSITORY AND INFORMA- TION DISTRIBUTION SYSTEM," which is incorporated herein in its entirety and for all purposes.

One type of multigame machine has a mechanism by means of which one of the stored games within the machine can be selected for operation (or possibly a sub-range of the stored games). In prior art multigame machines such a mechanism has been a combination of operator accessible buttons (for example located behind a lockable flap) and a menu which the operator is able to cause to be displayed on the screen 2, for example. It is clearly a time consuming activity to unlock the flap, push the required button or buttons to display the menu, follow the menu instructions with more button pushing, close and lock the flap, and then repeat the procedure with the next machine.

Figure 3:
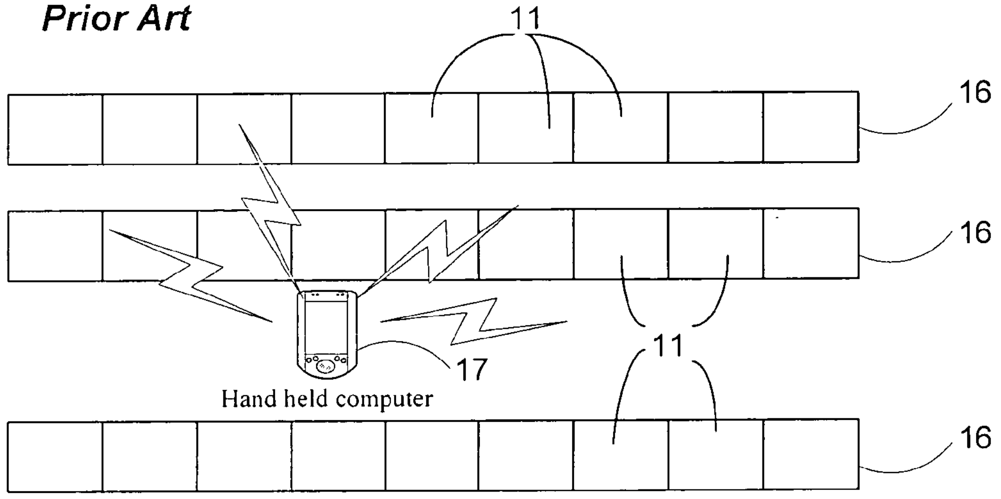
FIG. 3 illustrates the layout of a gaming establishment having a plurality of the machines of FIG. 2.

As indicated in FIG. 3, most gaming venues have large numbers of machines generally arranged in rows or banks on a gaming floor. The dimensions of the gaming floor may range from tens of meters to hundreds of meters depending upon the size of the establishment. FIG. 3 illustrates a portion of such a gaming floor. For a small establishment there may be only the three illustrated rows 16 of machines 11 but for a large establishment there may be many such rows 16.

Figure 4:
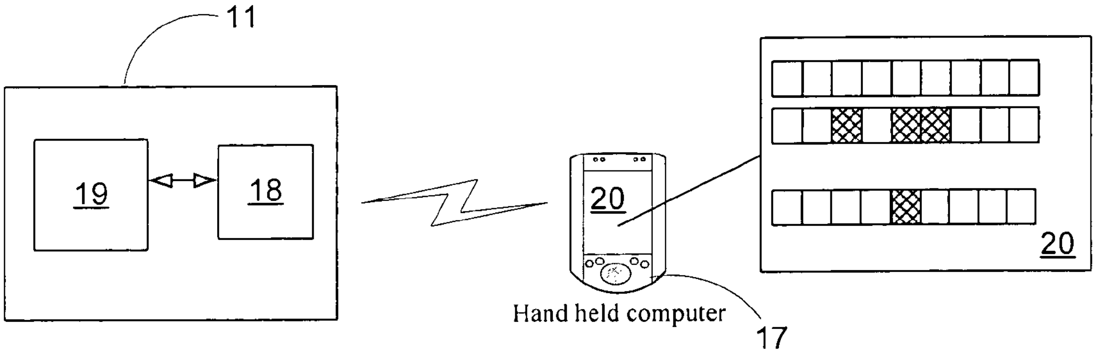
FIG. 4 illustrates the master gaming controller and communications module of the machine of FIGS. 2 and 3 communicating with the transposer of FIG. 3.

Also illustrated in FIG. 3 is a personal digital assistant (PDA) 17 such as a PALM PILOT or IPAQ (Registered Trade Marks) or a custom transposer, or similar, which as indicated in FIG. 4, is able to communicate with a communications module 18, which is connected with the master gaming controller 19 of the gaming machine 11. The master gaming controller 19 typically includes a central processing unit (CPU) and controls game play on the machine 11. Details of a master gaming controller 19 that may be used with the present invention are described in co-pending U.S. application Ser. No. 09/690,931, filed Oct. 17, 2000 and titled "HIGH PERFORMANCE BATTERY BACKED RAM INTERFACE," which is incorporated herein in its entirety and for all purposes.

The communication module 18 may provide communications via a wireless interface. In one embodiment, the wireless interface may be located in a player tracking unit and the communication module may provide a communication link to the player tracking unit. In another embodiment, the wireless interface may be coupled directly to the gaming machine and the communication module may provide a communication link from the wireless interface to the master gaming controller 19.

The PDA 17 may be equipped with a BLUETOOTH (Registered Trade Mark) module, which enables remote communication over a relatively short range (typically 1-10 meters for class II and 10-100 meters for Class I). The transmission can be either wireless or infrared and other similar devices such as BLUEFISH (Registered Trade Mark) disclosed in WO 01/54104 can be used instead. However, the BLUETOOTH device has the advantage of wide commercial acceptance. Other wireless standards such as 802.11 ETHERNET, ZIG BEE or similar, can also be used.

Typically, Bluetooth devices send out signals in the range of 1 milliwatt. The signal strength limits the range of the devices to about 10 meters and also limits potential interference sources. Interference is also limited by using spread-spectrum frequency hopping. For instance, a device may use 79 or more randomly chosen frequencies within a designated range that change on a regular basis up to 1,600 times a second. Thus, even if interference occurs, it is likely only to occur for a short period of time.

When Bluetooth-capable devices come within range of one another, an electronic conversation takes place to determine whether they have data share or whether one needs to control the other. The connection process is performed automatically. Once a conversation between the devices has occurred, the devices form a network. Bluetooth systems create a Personal-Area Networks (PAN) or "piconets". While the two or more devices in a piconet remain in range of one another, the distances between the communications devices may vary as the wireless devices are moved about. Once a piconet is established, such as between the wireless interface device 264 and a portable wireless device, the members of the piconet randomly hop frequencies in unison so they remain in touch with another and avoid other piconets that may be operating in proximity to the established piconet. When Bluetooth is applied in a casino environment, many such piconets may be operating simultaneously. Details of the Bluetooth™ standard and the Bluetooth™ special interest group may be found at www.bluetooth.com.

Within the PDA 17 is a store of data including the numbers of various authorized employees each having an associated PIN number. Thus an employee enters his authorization number followed by his PIN number to activate the PDA17. The PDA 17 then communicates with all machines 11 in range and interrogates them to confirm an active status. A list of all active machines 11 within range of the PDA17 then appears on the display screen of the PDA17. The authorized employee is then able to select one or a group of machines 11 from those listed on the PDA display. Thus each machine is individually addressable or a group of machines are simultaneously addressable.

The PDA 17 may store and display information regarding a casino layout on screen 20. Active machines 11 within range of the PDA 17 may be highlighted on the screen 20. In addition, machines 11 selected for modification or interrogation may be highlighted on the screen 20. The PDA 17 may include a GPS receiver or some other location device that allows the location of the PDA to be highlighted on the casino layout. In a large casino, the casino layout and the location device on the PDA 17 may be used to guide a user to a particular gaming machine 11 or a bank of gaming machine 16. For instance, arrows may be displayed on the screen of the PDA 17 to direct a user to a particular location.

The PDA17 can then be used both to download commands to the addressed machine(s) 11 and to upload status information or upload responses to the commands. The commands may be compatible with software or firmware currently residing on the gaming machine or a gaming peripheral, such as a bill validator or player tracking unit coupled to the gaming machine.

In one embodiment, the PDA may be used to select a particular game from a suite of games present in a selected gaming machine or a selected group of gaming machine. In another embodiment, the PDA may be used to select from a suite of games available for download from a server in communication with the gaming machines. For instance, the PDA may be in communication with a remote gaming repository, as described in U.S. Pat. No. 6,645,077 previously incorporated herein. The remote server may provide to the PDA 17 details of games, graphics and software components that are available for download.

The game currently available for play on each gaming machine may be represented using one or more graphical icons displayed over the gaming machines in the casino layout of screen 20, which may help the user in their update process. Further, the PDA 17 may provide performance data for one or more gaming machines as well as performance data for a game in general (e.g., averaged over a number of gaming machines.) The performance data may be employed by the user to help them to select a new game for a particular gaming machine.

In one embodiment, the performance data may be stored on the gaming machine and the PDA 17 may be operable to interrogate the gaming machine for the data. In another embodiment, the performance data may be stored on a player tracking unit coupled to the gaming machine and the PDA 17 may interrogate the player tracking unit. In yet another embodiment, the PDA 17 may be operable to contact a remote server that includes performance data for a particular gaming machine.

The performance data obtained by the PDA may be presented in many different manners, such as data from a particular game played on the gaming machine, data from a number of different games played on the gaming machine or data from games that a particular individual has played. For instance, in one embodiment, the PDA 17 may be used to obtain historical information regarding a previous game that a particular player has played on a gaming machine, such as a game played 5 games prior to the current game. The game history information may be used as part of a dispute resolution process. In another embodiment, the PDA may able to gather and present game play information for a particular player on all of the gaming machines in wireless communication with the PDA 17.

In one embodiment, the PDA 17, the remote server, the gaming machine may execute software that analyzes performance data for a gaming machine, a group of gaming machines and different games. This software may be used to project a performance of a particular game that is being considered as an update for a gaming machine or a group of gaming machines. For example, based upon a gaming machine's location, its past performance, a performance of a particular game, and a demographic profile of users (e.g., a distribution of ages), the software may predict and compare performances for a number of selected games. In another embodiment, the software may predict the performance of a group of gaming machines with a particular mix of games. Further, the analysis software may provide performance predictions that compare different mixes of games and distributions of games applied to a particular group of gaming machines. The performance data, the performance projections and comparisons may be displayed on the display screen 20 of the PDA 17.

The performance predictions may be generated by multiplying the current performance of the gaming machine by different weighting factors. For example, to predict the effect of a performance of a new game on the gaming machine, the current performance of the gaming machine may be multiplied by a ratio of the average performance of the new game divided by the average performance of the new game. As another example, to predict the effect of a new game on the gaming machine, the current performance of the gaming machine may be multiplied by a ratio of the performance of gaming machine with the new game in a similar location divided by the performance of the gaming machine in the current location.

The demographic weighting factors may be generated using player tracking data to determine the relative popularity of different games as a function of a person's age. For game selection, these weighting factors may be useful during a particular time of year. For instance, the number of young people may increase during weekends or spring break as compared to other times of the year. Thus, given a selection of a new game, an expected demographic distribution and a relative popularity of the game as a function of the demographic distribution, a prediction for the performance of the new game on the gaming machine (e.g., coin-in/time) may be made.

Once a game has been selected for a gaming machine or group of gaming machine, the PDA 17 may be used to simultaneously update all machines to the desired game thereby enabling rapid game changes to suit a busy venue social program. The game change may include the update of the graphics presented on display screen 13. If desired, the game change-over can be programmed to operate at a specific time in the future (in conjunction with the CPU clock) or after a specified time delay.

In addition, the authorized employee can interrogate the machine, or each machine in turn, to ascertain various operational parameters such as rate of note rejects, rate of coin rejects, cash turnover ratio, and the like. This enables the authorized employee to make various managerial decisions in addition to more routine functions such as "keying-off" a jackpot on a machine. When this happens the credit value and security information are uploaded from the electronic controller 19 via the communications module 18 to the PDA17. Preferably the PDA17 includes a printer which enables the authorized employee to print a small coupon or ticket which the winning player can redeem for cash at a change booth. This development overcomes the previous need for each machine to have a ticket or coupon printer and even the need for a hopper for prize payments.

The same arrangements can also be used to download data into a machine 11. Thus a player wishing to transfer credits from one machine to another merely has to catch the attention of the authorized employee who then uses the PDA17 to upload the credits from the first machine 11 and then download the credits to the second machine 11.

Furthermore, the machines 11 can call for assistance once a fault is detected by internal surveillance equipment. Thus any PDA17 in range of a given machine 11 can be advised that, for example, the cash tin is almost full, the hopper is almost empty, printer paper is low, various lamps and/or buttons have malfunctioned, and the like. This enables maintenance or preventative maintenance, to be carried out at the earliest opportunity. As a consequence machine downtime is reduced.

In connection with maintenance, prior art machines require a significant amount of time for technicians to manually enter data, such as configuration data, into a machine. Such data includes game type, percentage return, button panel layout, GMID number, house number and the like. Instead by use of the PDA17, this data can be quickly downloaded to a particular machine 11, or a group of such machines 11. Similarly, diagnosis of any fault in the machine 11 can be speeded up by status data upload, especially in the case where the machine screen 2,12 has malfunctioned.

In this connection, it will be appreciated that transfer of a sub-routine stored in the PDA17 is a much faster method of data input than manual manipulation of the prior art 3-button up/down menu selection system used by the prior art machines 1 of FIG. 1.

The PDA17 can also be used to check the integrity of gaming machine software even whilst a machine 11 is being played. For example, a cyclic redundancy check calculation of the machine program storage devices can be requested by the PDA17 without either the need to interrupt a player or the need for connection to any other system.

It will be appreciated by those skilled in the art that the system is especially secure since there is no transfer of "high security" data such as critical or game dependent data to, or from, the machine 11. Thus the integrity of the gaming machine software cannot be compromised even if the transmission protocols become known. Thus all software (both operating system and game programs) located in the gaming machine 11, will be as submitted to, and approved by, the game licensing authorities. This is assisted by the preferred limited transmission range of the BLUETOOTH apparatus which makes it unlikely that anyone outside the gaming venue would be able to obtain wireless access to any of the machines 11.

Furthermore, some large gaming establishments with many gaming machines have monitor systems which cost hundreds of thousands of dollars. One aspect of such monitor systems is that they provide a player tracker function. However, the above described communications system can provide a low cost "entry level" player tracker function for those venues having a relatively small number of gaming machines. This is achieved by the PDA17 being used to upload game results from the machines 11. This data can then be transferred to a personal computer, or similar, and manipulated at will.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A communications and data transfer system for gaming establishments having a plurality of gaming machines arranged in a configuration, said system comprising a hand held portable transponder adapted to transmit and receive modulated electromagnetic radiation over a limited range which is about the linear distance occupied by said gaming machines, said transponder further comprising a display device and an input mechanism, and wherein each of said gaming machines includes a communication module connected to a master gaming controller of each said gaming machine, whereby identification and control signals for one or more selected gaming machines of said plurality of gaming machines can be input to, and sent from, said transponder to the master gaming controller of the one or more selected gaming machines and in reply thereto, status data of said one or more selected gaming machines can be sent to, or overwritten by, said transponder;

wherein said transponder is further operable to: make a prediction regarding performance of at least one new game to replace a current game of said one or more gaming machines, and display the prediction regarding the performance of the at least one new game on said one or more gaming machines, said performance comprising a ratio of coin-in to a unit of time.

2. The system of claim 1 wherein said transponder comprises a personal digital assistant.

3. The system of claim 1 wherein said transponder can download information to, and upload information from, a plurality of said gaming machines all located within said limited range.

4. The system of claim 3 wherein the transponder displays a list or a graphical representation of said plurality of said gaming machines all located within said limited range and in communication with said transponder.

5. The system of claim 4 wherein the selection of said game program occurs at a predetermined time and after transmission of said control signals.

6. The system of claim 1 wherein each of said plurality of gaming machine has stored therein a multiple number of game programs and each of said control signals selects one of said programs to determine which game can be played on said machines.

7. The system of claim 1 where each said gaming machine is operable to receive a download of a game program and said control signals are for selecting and for triggering the download of a selected game program to one or more of said plurality of gaming machines.

8. The system of claim 1 wherein said status data includes data selected from the group consisting of cash tin status, hopper status, printer paper status, button malfunction status, lamp status, note reject data, coin reject data and cash turnover ratio.

9. The system of claim 1 wherein said control signals input configuration data into the or each selected said gaming machine, said configuration data being selected from the group consisting of game type, percentage return, button panel layout, GMID number, and home number.

10. The system of claim 1 wherein said status data includes performance data for one or more selected gaming machines.

11. The system of claim 10 wherein the performance data is for games played by a particular player on the one or more selected gaming machines.

12. The system of claim 10 wherein the performance data is an outcome of a particular game played on the one or more selected gaming machines.

13. The system of claim 1 wherein the communication module is coupled to a wireless interface.

14. The system of claim 13, wherein the wireless interface is located on a player tracking unit coupled to the gaming machine.

15. The system of claim 14, wherein the transponder is operable to display a location of the transponder on the casino layout.

16. The system of claim 1, wherein the transponder is operable to display a map of a casino layout on the display.

17. The system of claim 1, wherein the transponder is operable to provide directions to a particular gaming machine of said plurality of gaming machines.

18. The system of claim 1, wherein each gaming machine is operable to generate a game of chance, receive cash or indicia of credit for wagers on the game of chance, to present an outcome for the game of chance and output cash or indicia of credit.

19. The communications and data transfer system of claim 1, wherein the prediction of performance is made based upon a location of said selected gaming machines, a past performance of said selected gaming machines, and a demographic profile of users of said selected gaming machines.

20. The communications and data transfer system of claim 1, wherein the prediction of performance is made by multiplying a measure of the current performance of said selected gaming machines by one or more weighting factors.

21. The communications and data transfer system of claim 20, wherein one or more of said weighting factors is based on one or more sources of information selected from the group of: an average performance of the new game, a performance of the at least one new game in a similar location, the number of gaming machines selected, player tracking data, a time of year, and a demographic distribution.

22. The communications and data transfer system of claim 20, wherein one of said weighting factors comprises a ratio of a performance of the at least one new game in a similar location and a performance of said selected gaming machines in their current location.

23. A method of outputting or changing status data of a selected one or ones of a plurality of electronic gaming machines each having a master gaming controller with an electromagnetic communication module connected thereto, said plurality of gaming machines being arranged in proximity to each other in a gaming establishment, said method comprising the steps of:

(i) bringing within range of said selected gaming machine a hand held portable transponder adapted to transmit and receive modulated electromagnetic radiation over a limited range which approximates to only the linear distance occupied by said gaming machines, (ii) making a prediction at said transponder regarding performance of at least one new wager-based game to replace a current wager-based game of said selected gaming machine, and displaying at said transponder the prediction regarding the performance of the at least one new wager-based game on said selected gaming machine, (iii) transmitting identification and control signals from said transponder to said selected gaming machine(s) to both select game and enable the master gaming controller thereof, and (iv) receiving from said selected gaming machine(s) at said transponder, status data of said selected gaming machine, and/or (v) transmitting from said transponder to said selected gaming machine(s) status data which is over-written into the master gaming controller of said selected gaming machine(s).

24. The method of claim 23, wherein the status data is for specifying one or more game programs available for play of selected gaming machine(s).

25. The method of claim 23, further comprising: transmitting from said transponder control signals to the gaming machine to trigger a download of a selected game to said gaming machine(s).

26. The method of claim 23 further comprising: transmitting from said transponder control signals to the gaming machine to input configuration data into the or each selected said gaming machine, said configuration data being selected from the group consisting of game type, percentage return, button panel layout, GMID number, and home number.

27. A method of selecting a game for a gaming machine on a hand-held computing device, the method comprising:

displaying a list or a graphical representation of one or more gaming machine in communication with the hand-held computing device;

receiving a selection of one of the gaming machines via an input device on the hand-held computing device;

displaying performance data for the selected gaming machine on a display screen of the hand-held computing device;

receiving a selection of a new game for the selected gaming machine via the input device on the hand-held computing device;

determining a predicted performance of the new game on the selected gaming machine, said performance relating to the financial profitability of the gaming machine;

displaying the predicted performance of the new game on the selected gaming machine on the display screen of the hand-held computing device; and transmitting from the hand-held computing device to said selected gaming machine status data which is over-written into a master gaming controller of said selected gaming machine wherein the status data is for allowing the new game to be made available for play on the gaming machine.

28. The method of claim 27, wherein only one game is available for play on the gaming machine at any one time.

29. The method of claim 27, wherein the status data triggers a download of the new game from a remote device to the selected gaming machine.

30. A hand held portable transponder adapted to transmit and receive modulated electromagnetic radiation over a limited range about the linear distance occupied by a plurality of gaming machines; wherein each of said gaming machines includes a communication module connected to a master gaming controller of each said gaming machine whereby identification and control signals for one or more selected gaming machines of said plurality of gaming machines can be input to, and sent from, said transponder to the master gaming controller of the selected gaming machines and in reply thereto, status data of said selected gaming machines can be sent to, or overwritten by, said transponder; and wherein said transponder is further adapted to make a prediction regarding performance of at least one new game to replace a current game of said selected gaming machines, and display the prediction regarding the performance of the at least one new game on said selected gaming machines, said performance comprising a ratio of coin-in to a unit of time.

31. A computer readable medium including computer program code, comprising:

computer program code for allowing a hand held portable transponder to transmit and receive modulated electromagnetic radiation over a limited range about the linear distance occupied by a plurality of gaming machines, wherein each of said gaming machines includes a communication module connected to a master gaming controller of each of said gaming machine;

computer program code for sending by said transponder identification and control signals for one or more selected gaming machines of said plurality of gaming machines; and computer program code for allowing said hand held portable transponder to make a prediction regarding performance of at least one new wager-based game to replace a current wager-based game of said selected gaming machines, and display the prediction regarding the performance of the at least one new wager-based game on said selected gaming machines.

32. A system comprising a gaming machine and a hand held portable transponder, the gaming machine operable to receive identification and control signals from the hand held portable transponder, the hand held portable transponder adapted to transmit and receive modulated electromagnetic radiation over a limited range about the linear distance occupied by a plurality of gaming machines including said gaming machine; wherein each of said plurality of gaming machines includes a communication module connected to a master gaming controller of each said gaming machine whereby identification and control signals for said games can be input to, and sent from, said transponder to the master gaming controller of said gaming machine; and wherein said transponder is further adapted to make a prediction regarding performance of at least one new game to replace a current game of said gaming machine, and display the prediction regarding the performance of the at least one new game of said gaming machine, said performance relating to the financial profitability of the gaming machine.

33. A system as recited in claim 32, wherein said gaming machine is further operable to send the hand held portable transponder status data of said gaming machine.

* * * * *